United States Patent [19]

Tezuka et al.

[11] 4,334,588
[45] Jun. 15, 1982

[54] VEHICLE ENGINE NOISE REDUCING ASSEMBLY

[75] Inventors: Toru Tezuka, Sagamihara; Akira Matsuda, Atsugi, both of Japan

[73] Assignee: Caterpillar Mitsubishi Ltd., Tokyo, Japan

[21] Appl. No.: 121,347

[22] Filed: Feb. 14, 1980

[30] Foreign Application Priority Data

Apr. 27, 1979 [JP] Japan .................. 54-052279

[51] Int. Cl.³ ............................................. B60K 11/04
[52] U.S. Cl. .................................. 180/68 P; 181/211
[58] Field of Search ................ 180/68 P, 69 R, 54 A; 181/204, 211, 286

[56] References Cited

U.S. PATENT DOCUMENTS

| | | | |
|---|---|---|---|
| 3,489,351 | 1/1970 | Patterson | 239/78 X |
| 3,762,489 | 10/1973 | Proksch et al. | 180/169 R |
| 3,812,927 | 5/1974 | Kawamura | 180/54 A |
| 3,820,629 | 6/1974 | Carlson et al. | 180/69 R X |
| 3,857,453 | 12/1974 | Buttke et al. | 180/54 A |
| 3,897,850 | 8/1975 | Thompson et al. | 181/33 K |
| 3,960,238 | 6/1976 | McClure et al. | 180/69 R X |
| 4,121,683 | 10/1978 | Kohriyama | 180/68 P |

FOREIGN PATENT DOCUMENTS 49-40169 10/1974 Japan.
51-3733 1/1976 Japan.
52-105 1/1977 Japan.

Primary Examiner—Joseph F. Peters, Jr.
Assistant Examiner—Michael Mar
Attorney, Agent, or Firm—Joseph W. Keen

[57] ABSTRACT

A noise reducing assembly, including a sound absorbing grille (30) with louvers (33) and a sound and air diverting unit (40) is used for noise control in an earthmoving vehicle (20). The sound absorbing grille (30) has a perforated panel (32) covering an air exhaust opening (22). A plurality of sound absorbing louvers (33) are attached to the perforated panel (32) in spaced relationship. The sound and air diverting unit (40) is disposed in front of the sound absorbing grille (30), and includes means (42a,42b,42c) for diverting the sound and air from said sound absorbing grille (30) vertically and transversely of the vehicle body. The walls of the louvers (33) and the sound and air diverting unit (40) are filled with sound absorbing material (37,43).

13 Claims, 9 Drawing Figures

F I G. 8
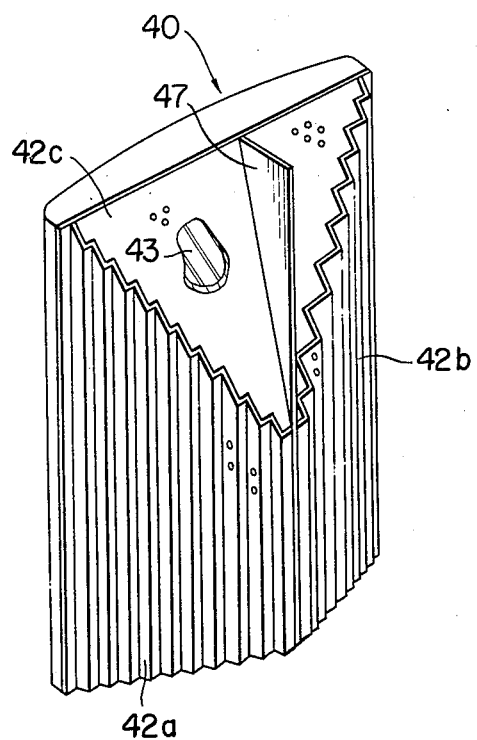
F I G. 9
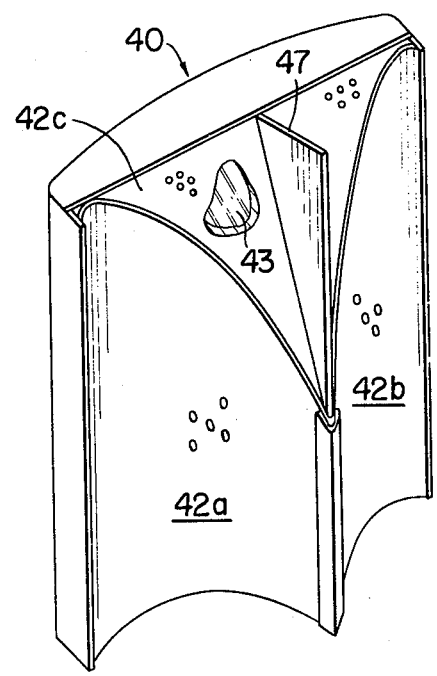

VEHICLE ENGINE NOISE REDUCING ASSEMBLY

DESCRIPTION

TECHNICAL FIELD

This invention relates to noise control for an earthmoving vehicle, and more particularly to a noise reducing assembly provided forwardly of the radiator.

BACKGROUND ART

It has been desirable in recent years to provide improved noise control in earthmoving vehicles without impairing the engine cooling function. Prior art includes Japanese Patent Publication No. 49-40169 dated Oct. 31, 1974 by Kabushiki Kaisha Komatsu Seisakusho and U.S. Pat. No. 4,121,683 issued Oct. 14, 1978 to Y. Kohriyama. These devices have been arranged so that sound and air discharged through the air exhaust opening in the radiator guard are discharged upwardly from a vehicle body by a radiator mask or a radiator silencer attached to the front of the radiator guard, reducing noise at both the front and at the sides of the vehicle body. However, the prior art devices have resulted in increased noise at the level of the upper part of the vehicle body, which may be objectionable when the vehicle is operating in urban or other noise-sensitive areas.

In the prior art devices having the radiator mask or radiator silencer attached to the front of the radiator grille, there is a large opening that leaves the front of the radiator core substantially open. Foreign matter, such as soil, sand, and the like, can impinge on the radiator core by action of the cooling fan during machine operation. This can damage the radiator core or reduce its efficiency by adhering thereto. Another shortcoming of the radiator silencer is that it extends a greater than normal distance from the front of the vehicle body in order to introduce exhaust air smoothly into the upper portion of the vehicle body, thus requiring more space and detracting from the general appearance of the vehicle.

DISCLOSURE OF THE INVENTION

According to the present invention there is provided a noise reducing assembly for use in an earthmoving vehicle having a cooling fan, a radiator, a radiator guard having an air exhaust opening and disposed at the front of the radiator. A sound absorbing grille having a perforated panel and attached sound absorbing louvers is disposed at the front of the vehicle body and covers the air exhaust opening in the radiator guard. A sound and air diverting unit disposed in front of the sound absorbing grille containing sound absorbing material diverts sound and air from the sound absorbing grille vertically and horizontally of the vehicle body.

BEST MODE FOR CARRYING OUT THE INVENTION

Figure 1:
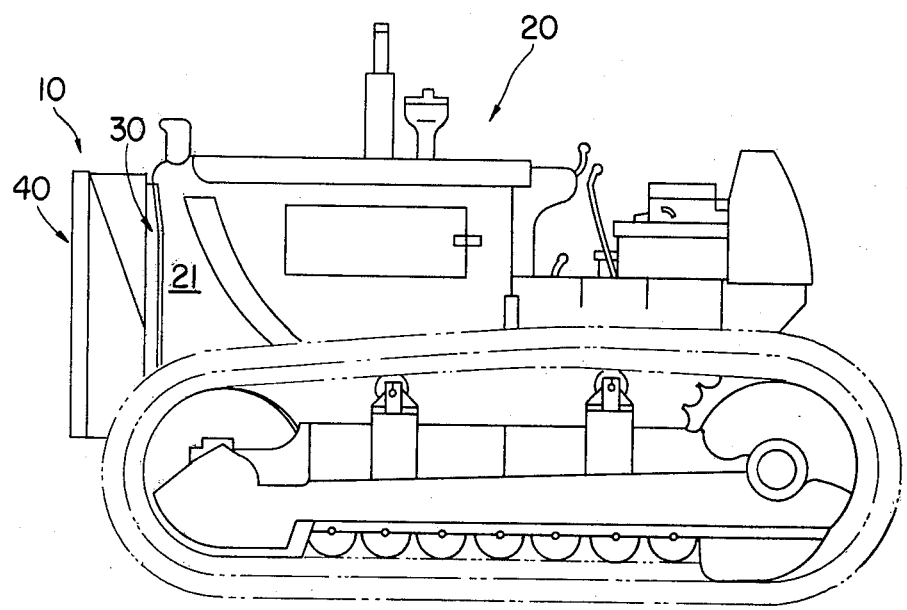
FIG. 1 is a schematic side view of a track-type vehicle equipped with a noise reducing assembly.

A tractor 20 is equipped with a noise reducing assembly 10 including a sound absorbing grille 30 attached to the front of a radiator guard 21, and a sound and air diverting unit 40 arranged in front of the sound absorbing grille 30.

Figure 2:
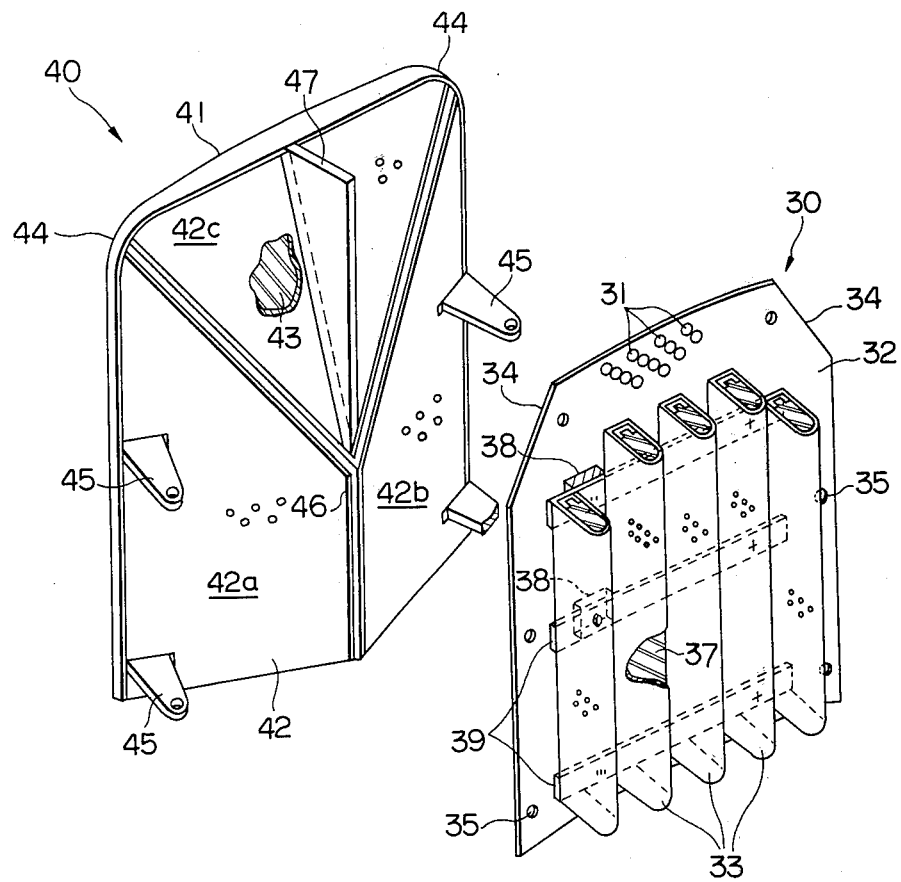
FIG. 2 is an exploded perspective view of the noise reducing assembly.

The sound absorbing grille 30, as best seen in FIG. 2, includes a perforated panel 32 provided with a number of small holes 31 over its entire surface, and a plurality of sound absorbing louvers 33 attached to the inside or rear wall of the perforated panel 32 at a desired spacing from each other. The perforated panel 32 is a steel plate having appropriate strength, curved in a manner to project the central portion thereof toward the front of the vehicle body to some extent. The panel is bevelled at the left and right top shoulders 34 in the manner shown in FIG. 2, to fit the contour of the interior of the radiator guard 21. The perforated plate 32 contains a plurality of bolt holes 35 and an opening 36 (FIG. 3) running from the center to the lower edge thereof, for receiving therein a ridge on the rear or inner surface of the sound and air diverting means 40, which will be described later.

Figure 5:
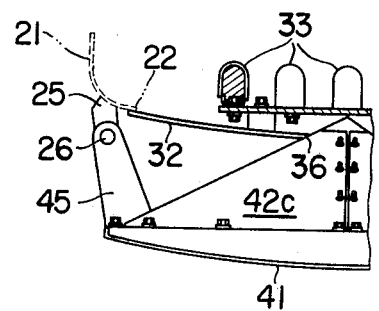
FIG. 5 is a fragmentary partially sectioned plan view of the noise reducing assembly.

Each sound absorbing louver 33 attached to the perforated panel 32 has a tubular generally U-shaped cross section member made of a thin plate, filled with a sound absorbing material 37. These louvers 33 are removably secured to the inner or rear wall of the perforated panel 32 and preferably spaced therefrom. For this purpose, lugs 38 are attached to the inner wall of the panel in symmetrical relation to each other, and horizontal members 39 are bolted to these lugs 38. The sound absorbing louvers 33 are bolted to the horizontal members 39, as best shown in FIG. 5. In this manner, a minimum number of holes 31 are covered by the louvers.

Figure 3:
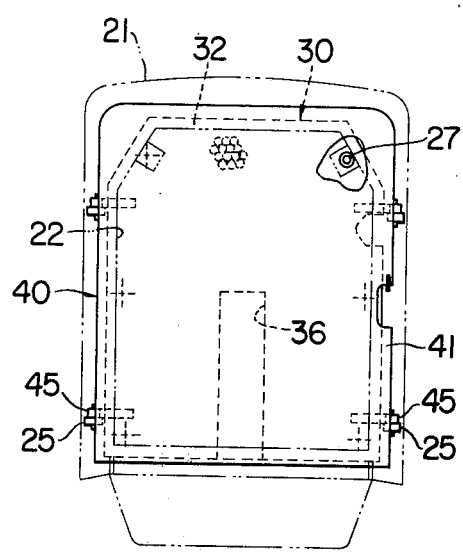
FIG. 3 is a schematic front view, partly broken away, of the noise reducing assembly.
Figure 4:
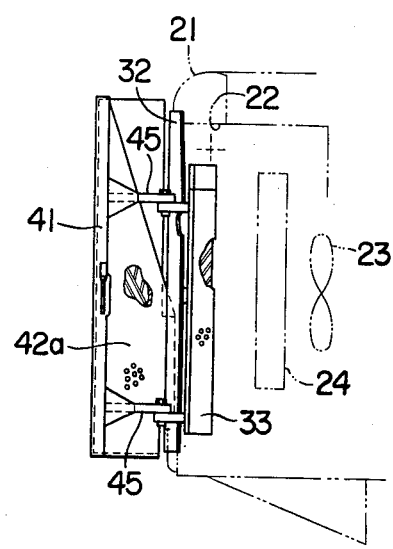
FIG. 4 is a side view, partly broken away, of FIG. 3.

The sound absorbing grille 30 is attached to the vehicle body in a manner to cover the air exhaust opening 22 entirely, as best seen in FIGS. 3 through 5. This is accomplished by fastening the perforated panel 32 with bolts 27 to the lugs 38 projecting from the peripheral portion of the air exhaust opening 22 in the radiator guard. Sound and air discharged through the air exhaust opening by the cooling fan is absorbed by the sound absorbing louvers 33, and is then discharged through the small holes in the perforated panel 32 to the outside of the air exhaust opening 22. The perforated panel 32 has a function of preventing ingress of earth, sand and the like into the radiator guard 21, so that the radiator core 24 is protected from being damaged or clogged with such foreign materials.

The sound and air diverting unit 40 includes a front plate 41 having a dimension somewhat larger than the sound absorbing grille 30, a diverting plate 42 covering the over-all reverse surface of the front plate 41 (which faces the sound absorbing grille 30), and a sound absorbing material contained in the space between the front plate 41 and the diverting plate 42. The front plate 41 is advantageously a steel plate having adequate strength, curved in a manner to project the central portion toward the front of the vehicle body in like manner as the sound absorbing grille 30, and rounded at left and right top shoulders 44 in conformity with the left and right top shoulders of the radiator guard 21. In this manner, the integrity of the front plate with the vehicle body is ensured when assembled to the radiator guard 21. A plurality of hinge plates 45 are rigidly secured, as by welding, to the reverse surface of the front plate 41 in the vicinity of the opposite vertical edges thereof. The hinge plates conveniently attach the sound and air diverting unit 40 to the vehicle body as hereafter described.

The diverting plate 42 covering the entire reverse surface of the front plate 41 is advantageously formed of a thin plate. It has a left slope 42a extending from the central portion of the reverse surface of the plate to the left vertical edge of the plate 42, a right slope 42b extending from the central portion to the right vertical edge, and an upper slope 42c extending therefrom to the upper edge thereof. These three slopes present a generally pyramid-like shape. Slopes 41a,42b and 42c are joined to the corresponding edges of the front plate 41, respectively, and the opposing edges of the neighboring slopes are joined to each other by any suitable means, such as welding or bolting. A partition plate 47 is rigidly secured by any suitable means such as welding to the upper slope 42c along the vertical center line thereof. The partition plate 47 is so constructed and arranged to contact the front surface of the sound absorbing grille 30 when the sound and air diverting unit 40 is attached to the vehicle body. For a compact installation, a central ridge portion 46 of the sound and air diverting plate 42 may be partly fitted in the opening 36 in the sound absorbing grille 30. The opening 36 in the sound absorbing grille 30 is not necessary if the central ridge 46 of the sound and air diverting plate 42 is located in front of the sound absorbing grille 30.

The sound and air diverting unit 40 is pivotally secured to the vehicle body by inserting hinge pins 26 into the hinge plates 45 of the unit 40 and the hinge plates 25 of the radiator guard 21 which are aligned with each other, as seen in FIGS. 3 through 5. If the hinge pins 26 on one vertical edge of the vehicle body are removed therefrom, then the device 40 can be turned to an open or closed position about the hinge pins on the other vertical edge thereof. This facilitates the maintenance and inspection of the sound and air diverting device 40, as well as the repair, the maintenance and the inspection of the sound absorbing grille 30 and the radiator core 24, etc.

By placing the sound and air diverting unit 40 in front of the sound absorbing grille 30, sound and air discharged through the sound absorbing grille 30 by means of the cooling fan 23 is impinged on the sound and air diverting plate 42. The sound is partially absorbed by sound absorbing material 43 placed between plates 42 and 41 and partially diverted vertically and transversely of the vehicle body by way of respective slopes 42a,42b and 42c. Thus noise in the peripheral portion of the vehicle body, particularly at the front of the vehicle body, is greatly reduced. The sound air diverting device 40 projects only slightly to the front of the vehicle body since the sound and air diverting unit 40 is relatively thin, and the central ridge 46 of the sound and air diverting plate 42 is partly fitted in the opening 36 in the sound absorbing grille 30 when the device is mounted on the vehicle. This permits reduction of mounting space as well as maintaining the general appearance of the vehicle body.

The central partition plate 47 of the upper slope plate 42c extends between the sound and air diverting unit 40 and the sound absorbing grille 30. This allows sound and air discharged by way of the sound absorbing grille 30 by the cooling fan 23 to smoothly divert upwardly from the vehicle body, independently of air movement from the laterial portions of the vehicle body. The partition plate 47 also closes the gap between the sound and air diverting unit 40 and the sound absorbing grille 30, forming an integral unit.

It has been seen that the sound absorbing grille 30 is attached to the radiator guard 21 to cover the air exhaust opening thereof, and the sound and air diverting unit 40 is mounted in front of the sound absorbing grille 30. Sound and air discharged through the air exhaust opening 22 in the radiator guard 21 by the cooling fan 23 are absorbed by both the sound absorbing grille 30 and the sound and air diverting unit 40, and noise attenuation is obtained. The sound and air are thus diverted vertically and transversely of the vehicle body without a likelihood that sound in any specific direction of the vehicle body increases. The sound absorbing grille 30 functions to protect the radiator core 24 from ingress of earth, sand, and the like from the exterior as well as to cover lift cylinders or other components disposed within the radiator guard 21, thus providing a neat appearance to the vehicle.

Figure 6:
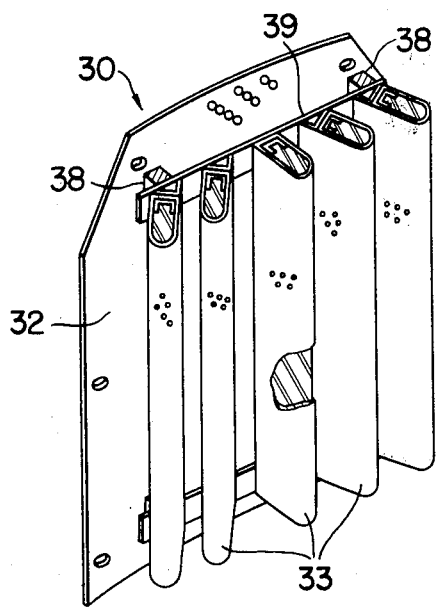
FIGS. 6 and 7 are perspective views of modifications of the sound absorbing grille; and, FIGS. 8 and 9 are perspective views, partly broken away, of modifications of a sound and air diverting unit.

FIG. 6 shows a modification of the sound absorbing grille 30 in which the sound absorbing louvers 33 are placed at oblique angles with respect to the perforated panel 32. In this modification sound and air take an irregular direction between respective louvers 33, thus providing an increased sound absorbing effect.

Figure 7:
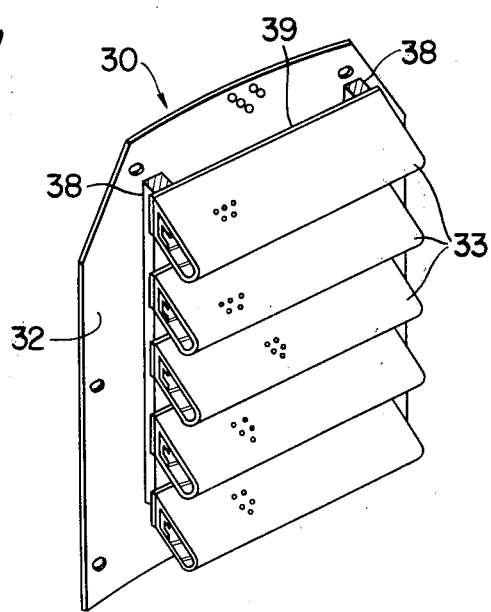

FIG. 7 shows a further modification of the sound absorbing grille 30. In this embodiment, the louvers 33 are attached to the perforated panel 32 in vertically spaced relation to each other and form an oblique angle with respect to the panel surface. Again sound and air take an irregular direction between the respective louvers.

FIG. 8 shows a modification of the sound and air diverting unit 40. In this embodiment, the laterally slanting plates 42a and 42b are formed of a corrugated punched plate to increase the surface area and to improve sound absorbing effect by the sound absorbing material 43.

FIG. 9 illustrates a further modification of the unit 40, wherein the laterally slanting plates 42a and 42b have concave surfaces to increase the surface area thereof. This increases the sound absorbing effect by the sound absorbing material 43 and diverts streams of sound and air discharged through the sound absorbing grille 30 to some extent toward the rear of the vehicle body, resulting in noise attenuation.

In the various embodiments, the sound and air dispersing plates of the sound diverter may be made from perforated plate, wire cloth or an expanded metal, in order to increase the openings in respective plate 42.

INDUSTRIAL APPLICABILITY

According to the embodiments of the present invention, sound and air discharged through the air exhaust opening in the radiator guard by the cooling fan are at first absorbed by the sound absorbing grille covering the air exhaust opening. Then the sound and air are absorbed by the sound and air diverting unit mounted in front of the sound absorbing grille, and at the same time diverted vertically and transversely of the vehicle body. Thus, an unusual increase of sound in any specific direction of the vehicle body is avoided. An earthmoving vehicle equipped with the sound diverter is suited for use in urban or other noise-sensitive areas. The perforated plate with comparatively small holes covers the air exhaust opening in the radiator guard, protecting the radiator guard from earth, sand, and the like, reducing the likelihood of damage or clogging to the radiator core. Both the sound and air diverting means and the sound absorbing grille are reduced in size in the longitudinal direction of the vehicle body and require only a small space, thereby providing a noise reducing assembly that is compact in size.

We claim:

1. A noise reducing assembly for use in an earthmoving vehicle (20) provided with a cooling fan (23), a radiator (24), a radiator guard (21) disposed in front of said radiator (24), having left and right upper shoulder portions, and having an air exhaust opening (22), the assembly comprising:

a sound absorbing grille (30) including a perforated panel (32) sized for covering at least a portion of said air exhaust opening (22), a plurality of sound absorbing louvers (33) and means for mounting said louvers on said perforated panel; and, a sound and air diverting unit (40) disposed in spaced relationship in front of said sound absorbing grille (30), including means (42a,42b,42c) for diverting the sound and air from said sound absorbing grille (30) vertically and transversely of the vehicle body, said sound and air diverting means includes left and right slopes (42a, 42b) extending from a vertical ridge (46) in substantially the central portion of the rear surface of said sound and air diverting unit (40) to the left and right vertical edges of said unit (40), respectively, thereby being inclined toward the front of the vehicle body (20), said sound and air diverting unit (40) further including an upper slope (42c) extending from substantially the central portion of the rear surface of said sound and air diverting unit (40) to the upper edge thereof, thereby being inclined toward the front of the vehicle body, said sound and air diverting unit (40) containing a sound absorbing material.

2. Apparatus as defined in claim 1, wherein said respective sound absorbing louvers (33) are attached by spaced apart intermediate members (39) to said perforated panel (32).

3. Apparatus as defined in claim 1, wherein said respective sound absorbing louvers (33) are attached to said perforated panel (32) in spaced vertical parallel relationship.

4. Apparatus as defined in claim 1, wherein said respective sound absorbing louvers (33) are attached to said perforated panel (32) in spaced horizontal parallel relationship.

5. Apparatus as defined in claim 3, wherein at least one of said respective sound absorbing louvers (33) forms an oblique angle with respect to the plane of said perforated panel (32).

6. Apparatus as defined in claim 4, wherein at least one of said sound absorbing louvers (33) forms an oblique angle with respect to the plane of said perforated panel (32).

7. Apparatus as defined in claim 1, wherein said upper slope (42c) having a partition plate (47) disposed along the vertical center line thereof and extending between said sound and air diverting unit (40) and said sound absorbing grille (30).

8. Apparatus as defined in claim 1, wherein said left and right slopes (42a,42b) are curved surfaces.

9. Apparatus as defined in claim 1, wherein said left and right slopes (42a,42b) are corrugated surfaces.

10. Apparatus as defined in claim 1, wherein said sound and air diverting unit (40) has a front plate (41) curved toward the front of the vehicle body (20) to present a convex exterior surface.

11. Apparatus as defined in claim 1, wherein said sound and air diverting unit (40) has left and right upper shoulder portions (44) which have an external radius of curvature substantially the same as the left and right upper shoulder portions of the interior of said radiator guard (21).

12. Apparatus as defined in claim 1, wherein said perforated panel (32) is provided with a central opening (36) for receiving therein a portion of a vertical ridge (46) on the rear surface of said sound and air diverting unit (40).

13. Apparatus as defined in claim 1, wherein said perforated panel (32) is curved to the front of the vehicle body (20) to present a convex surface.

* * * * *